April 22, 1952  H. A. JAMES  2,593,885
CASTING ROD
Filed Feb. 10, 1950
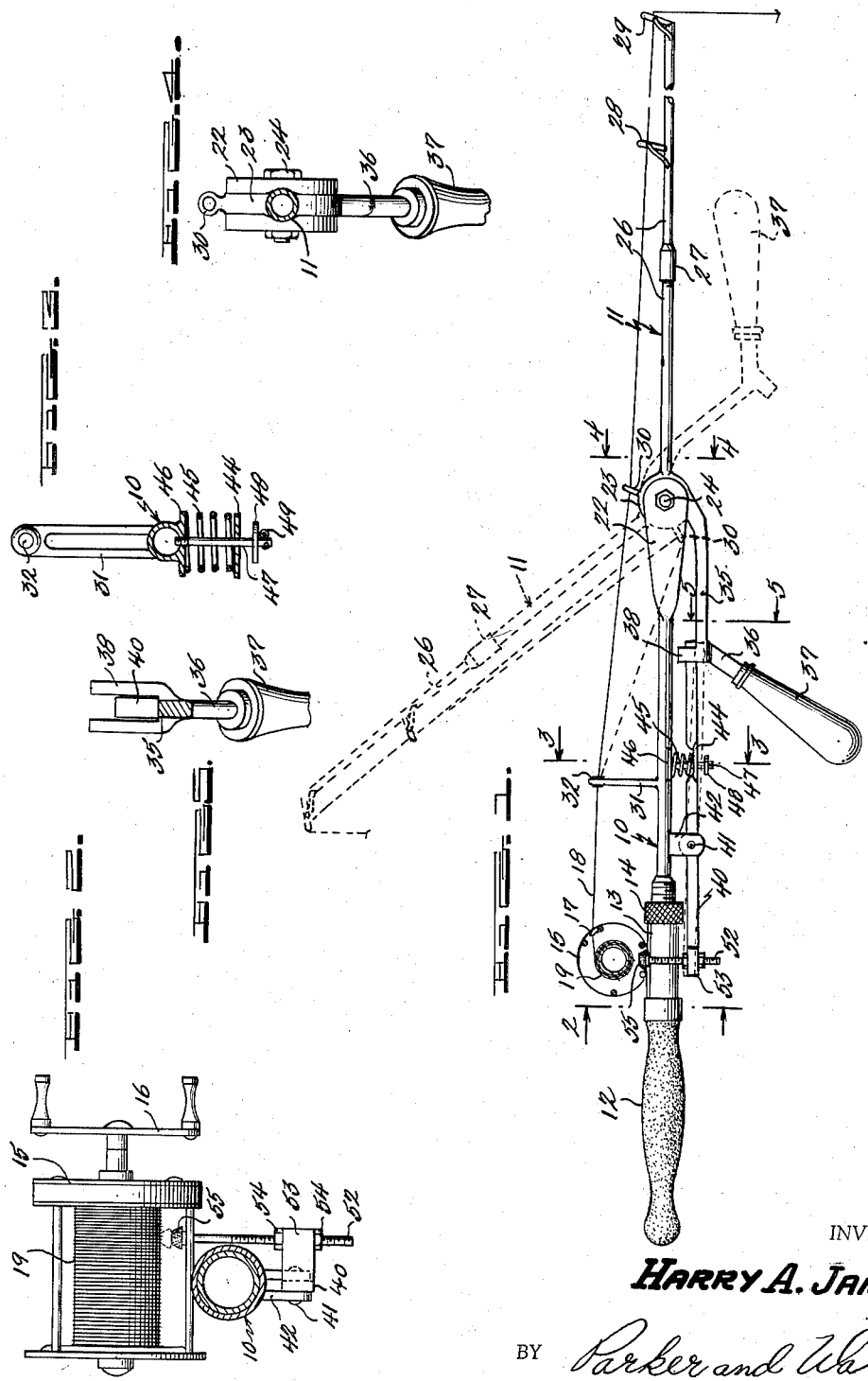
INVENTOR
*Harry A. James*
BY *Parker and Walsh*
ATTORNEYS Patented Apr. 22, 1952

2,593,885

UNITED STATES PATENT OFFICE 2,593,885

CASTING ROD

Harry A. James, Joplin, Mo.

Application February 10, 1950, Serial No. 143,537

10 Claims. (Cl. 43—19)

This invention relates to a casting rod, and more particularly to a fishing rod so constructed as to greatly facilitate the casting of the bait or lure.

An important object of the invention is to provide a novel fishing rod formed of two main elements pivoted to swing relative to each other whereby the two elements may be swung relative to each other for the purpose of facilitating the casting of the bait or lure by increasing both the distance and accuracy of the cast.

A further object is to provide such a fishing rod wherein the tip portion of the rod is pivoted relative to the butt portion and provided with a handle adapted to be grasped in the hand to swing the tip portion of the rod and greatly facilitate the casting operation.

A further object is to provide such a rod which not only makes it relatively easy to cast longer distances with greater accuracy, but wherein the casting operation may take place under conditions in which it ordinarily is difficult to cast.

A further object is to provide such a rod having an automatic thumber to prevent premature pulling of the line until the inertia of the bait, etc., is to be utilized at the proper point in the casting operation.

A further object is to provide a novel thumbing device operable in conjunction with the casting feature of the rod to be automatically released thereby from the reel to free the fishing line for unreeling movement at the proper time.

Other objects and advantages of the present invention will become apparent during the course of the following description.

In the drawing I have shown one embodiment of the invention. In this showing,

Figure 1 is a side elevation of the rod, parts being broken away,

Figure 2 is a transverse sectional view on line 2—2 of Figure 1,

Figure 3 is a similar view on line 3—3 of Figure 1,

Figure 4 is a similar view on line 4—4 of Figure 1, and

Figure 5 is a section on line 5—5 of Figure 1.

Referring particularly to Figure 1, the numerals 10 and 11 respectively indicate the butt and tip portions as a whole of a fishing rod. The butt portion or section is provided with the usual handle 12 forwardly of which comprises a rod section arranged the usual reel seat 13 having a knurled screw 14 for clamping the reel in position. A reel is shown in position on the rod section and is indicated by the numeral 15. This reel is operated by a handle device 16 and preferably is of the anti-backlash type, having an anti-backlash device 17 through which the fishing line 18 extends, this line being wound on the reel in the usual manner as indicated by the numeral 19.

At its forward end, the butt section of the rod is widened and bifurcated as at 22 to form a bearing for receiving the enlarged inner end 23 of the tip section 11. A pivot pin 24 connects the two rod sections to each other, as will be apparent.

The tip section 11 may be formed of separable sections 26 connected by the usual joint 27, and the tip sections may carry the usual line guides 28, one of which, as indicated by the numeral 29, may be mounted at the tip of the rod. The inner end member 23 of the tip section may be provided with a similar eye or guide 30, as shown in Figures 1 and 4. An upwardly extending preferably integral post 31 may be carried by the rod section 10 and provided at its upper end with a line guide 32, as shown in Figures 1 and 3.

Preferably formed integral with the inner end of the tip section 11 is a downwardly offset and rearwardly projecting arm or portion 35 normally arranged approximately parallel to the butt section 10 as shown in Figure 1. At its rear end, the arm 35 has a downwardly and rearwardly extending projection 36 carrying an operating handle 37. At its rear end, the arm 35 is provided with an upwardly extending fork or bifurcated member 38 for a purpose to be described.

The device is provided with an automatic thumber or brake in the form of a preferably relatively straight lever or bar 40 pivoted intermediate its ends as at 41 between depending arms 42 carried by the rod section 10 as shown in Figures 1 and 2. The forward end of the lever 40 is normally arranged between the forks or bifurcated member 38 as shown in Figures 1 and 5, in which position the tip section 11 is in substantial alignment with the butt section 10. Forwardly of the pivot 41, the lever is provided with a broadened seat 44 engageable by the lower end of a compression spring 45. The upper end of this spring engages a spring seat 46 (Figure 3). The spring 45 surrounds a pin 47 fixed at its upper end to the rod section 10 and projecting downwardly freely through the spring seat 44. A washer 48 on the rod 47, supported by a cotter pin or the like 49, limits downward movement of the adjacent portion of the thumber 40.

At its rear end, the lever 40 carries a threaded rod 52 (Figures 1 and 2) projecting through an offset 53 formed integral with the lever 40. Nuts 54 are threaded on the rod 52 to lock it in adjusted positions, and the upper end of the rod 52 carries a brake pad 55, engageable with the turns 19 of the fishing line on the reel.

*Operation*

Assuming that the rod is ready for use, the operator will hold the handle 12 in one hand and the handle 37 in the other hand. Preferably the handle 12 will be grasped by the left hand and the handle 37 by the right hand, and the handle will be moved to its forward limit of movement as shown in dotted lines in Figure 1. The operator will now hold the rod with the reel about shoulder high and with the tip pointed upwardly and rearwardly at an angle of about 30° to the horizontal. Under such conditions, the spring 45 acts to hold the brake pad 55 in engagement with the turns of line on the reel to prevent the reel from spinning.

The operator will now line the center of the reel and handle 37 with the target and pull down sharply on the handle 37 until the fork 38 and the rear end of the arm 35 engage the forward end of the lever 40 to move it upwardly, thus releasing the brake pad 55 and permitting the reel to spin. At this point, the bait is just moving outwardly from the end of the rod and the releasing of the thumber allows the reel to spin and thus permit the bait to be cast forwardly or outwardly from the operator. With the use of an antibacklash reel, the reel stops spinning when the bait lands.

With a rod approximately five feet long over all, only about three and one-half feet of overhead space is required in the use of the rod, which is not possible with a rod of conventional type of this size. The operator is permitted to cast through brush or between trees or from a sitting position in a boat. It has been found that inexperienced fishermen can cast unusual distances and with great accuracy with a few minutes' practice with the present rod. No controlling of the reel is necessary in view of the automatic operation of the thumbing device, and when used with an anti-backlash reel, it merely is necessary for the operator to pull rearwardly on the handle 37 with the rod held in proper position, in order to cast substantial distances and with a great degree of accuracy.

I claim:

1. A casting rod comprising a relatively stationary unit including a reel and a butt section, and a tip section normally arranged substantially in alignment with each other, means pivotally connecting the adjacent ends of said sections for turning movement on a normally horizontal axis transverse to said sections, handle means carried by said tip section to swing the latter in a bait casting operation from a rearward position over said butt section downwardly and forwardly to the normal position of said tip section, and a brake device carried by said relatively stationary unit and biased to operative position to resist turning movement of said reel, said handle means and said brake device having portions engageable with each other as said tip section approaches normal position for releasing said brake device from the reel.

2. A casting rod comprising a relatively stationary unit including a reel and a butt section, and a tip section normally arranged substantially in alignment with each other, means pivotally connecting the adjacent ends of said sections for turning movement on a normally horizontal axis transverse to said sections, handle means carried by said tip section to swing the latter in a bait casting operation from a rearward position over said butt section downwardly and forwardly to the normal position of said tip section, a brake device biased to an operative position resisting turning movement of said reel, and a lever carrying said brake device and projecting forwardly along said butt section to be engaged by said handle means as said tip section approaches normal position to release said brake device, said lever being carried by said relatively stationary unit.

3. A casting rod comprising a relatively stationary unit including a reel and a butt section, and a tip section normally arranged substantially in alignment with each other, means pivotally connecting the adjacent ends of said sections for turning movement on a normally horizontal axis transverse to said sections, handle means carried by said tip section to swing the latter in a bait casting operation from a rearward position over said butt section downwardly and forwardly to the normal position of said tip section, a lever arranged beneath said butt section and pivotally connected intermediate its ends to said stationary unit, a brake element at the rear end of said lever, resilient means engaging said lever to bias said brake element to an operative position resisting turning movement of said reel, the forward end of said lever being arranged in the path of travel of said handle means to be engaged thereby as said tip section approaches normal position to release said brake element.

4. A casting rod comprising a butt section and a tip section normally arranged substantially in alignment with each other, means pivotally connecting the adjacent ends of said sections for turning movement on a normally horizontal axis transverse to said sections, handle means carried by said tip section to swing the latter in a bait casting operation from a rearward position over said butt section downwardly and forwardly to the normal position of said tip section, a reel carried by said butt section, a lever arranged beneath said butt section and pivotally connected thereto intermediate its ends, a brake element at the rear end of said lever, resilient means engaging said lever to bias said brake element to an operative position resisting turning movement of said reel, said handle means having a fork engageable with the forward end of said lever as said tip section approaches normal position to release said brake element.

5. A casting rod comprising a butt section and a tip section normally arranged in alignment substantially in end to end relation, the end of said butt section adjacent said tip section being bifurcated to receive a portion of the tip section, means pivotally connecting said portion of said tip section to said bifurcated end for turning movement of said tip section on a normally horizontal axis, an arm fixed to said tip section and projecting rearwardly from said pivot axis normally parallel to and offset from said butt section, a reel carried by said butt section, and a brake device carried by said butt section and biased to an operative position for resisting turning movement of said reel, said brake device and said arm having portions engageable as said tip section approaches normal position for releasing said brake device.

6. A casting rod comprising a butt section and a tip section normally arranged in alignment substantially in end to end relation, the end of said butt section adjacent said tip section being bifurcated to receive a portion of the tip section, means pivotally connecting said portion of said tip section to said bifurcated end for turning movement of said tip section on a normally horizontal axis, an arm fixed to said tip section and projecting rearwardly from said pivot axis normally parallel to and offset from said butt section, a reel carried by said butt section, a lever pivotally connected to said butt section for turning movement on an axis parallel to said first-named axis, a brake element carried by said lever, and resilient means engaging said lever to bias said brake element to operative position resisting turning movement of said reel, said lever and said arm having portions engageable as said tip section approaches normal position for releasing said brake element.

7. A casting rod constructed in accordance with claim 6 wherein the portion of said arm engageable with said lever comprises a fork for receiving said portion of said lever therebetween, said arm having an operating handle normally projecting downwardly and rearwardly away from said butt section.

8. A casting rod comprising a butt section and a tip section normally arranged substantially in alignment with each other, said butt section having a reel seat adapted to support a reel, means pivotally connecting the adjacent ends of said sections to each other for turning movement on a normally horizontal axis transverse to said sections, handle means carried by said tip section to swing the latter in a bait casting operation from a rearward position over said butt section downwardly and forwardly to the normal position of said tip section, and a brake device carried by and movable relative to said butt section and biased to operative position to resist turning movement of a reel when positioned on said reel seat, said handle means and said brake device having portions engageable with each other as said tip section approached normal position for releasing said brake device from said reel.

9. A casting rod comprising a butt section and tip section, said butt section comprising a rod section and a handle secured to one end thereof, said tip section being pivotally secured to the other end of the rod section, said tip section having a portion extending downwardly and rearwardly from the pivot and having a part thereof provided with a downwardly inclined handle and an upwardly extending bifurcated member, said rod section having secured thereto a bar in the same plane as the rod section and directly above the downwardly inclined handle and having a portion thereof positioned in the path of movement of the bifurcated member, whereby the pivot, bifurcated member and bar will cause a portion of the tip section in advance of the pivot to be in alignment with the rod section when the last named handle is in a completed casting position.

10. A casting rod comprising a butt section and tip section, said butt section comprising a rod section and a handle secured to one end thereof, said tip section being pivotally secured to the other end of the rod section, said tip section having a portion extending downwardly and rearwardly from the pivot and having a part thereof provided with a downwardly inclined handle and an upwardly extending bifurcated member, a reel brake device carried by said rod section and having a portion thereof positioned in the path of movement of the bifurcated member, whereby said pivot, bifurcated member and portion of said reel brake device will cause a portion of the tip section in advance of the pivot to be in alignment with the rod section when the last named handle is in a completed casting position, and means biasing said reel brake device to operative position when said last named handle is moved away from its completed casting position.

HARRY A. JAMES.

REFERENCES CITED

The following references are of record in the file of this patent:

UNITED STATES PATENTS

| Number | Name | Date |
|---|---|---|
| 2,065,153 | Proudfit | Dec. 22, 1936 |
| 2,225,719 | Shotton | Dec. 24, 1940 |
| 2,496,403 | Nicholson | Feb. 7, 1950 |